June 8, 1965  M. W. RIGNALL  3,188,630
RADAR SYSTEMS
Filed Nov. 2, 1959
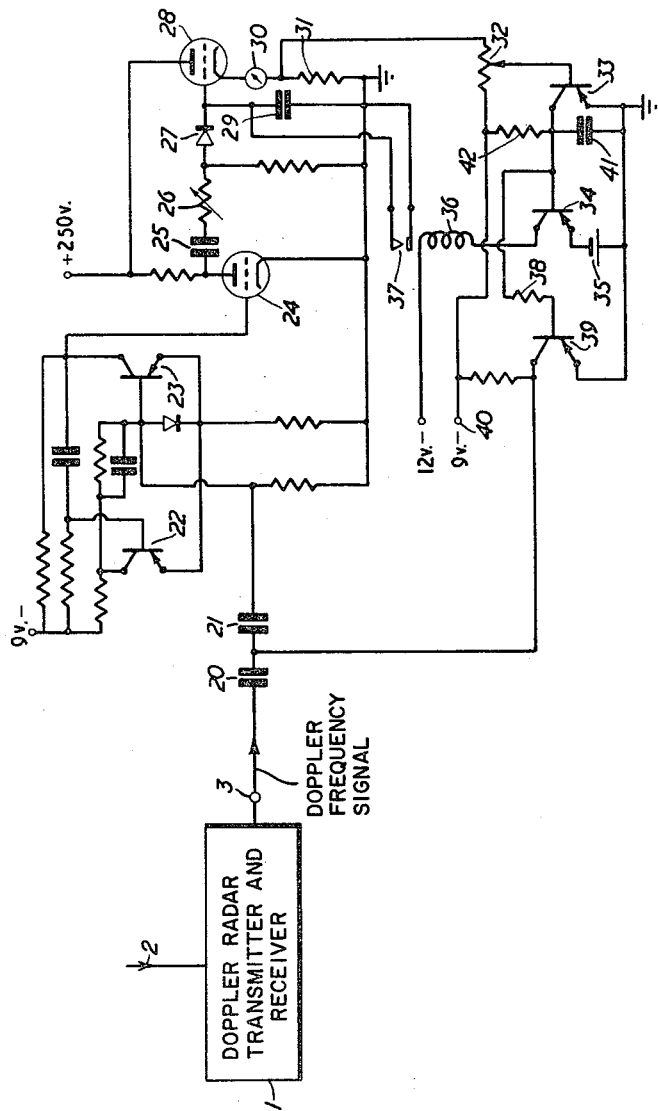
INVENTOR
Michael William Rignall
BY Baldwin & Wight
ATTORNEYS United States Patent Office 3,188,630
Patented June 8, 1965

3,188,630
RADAR SYSTEMS
Michael William Rignall, Chelmsford, Essex, England, assignor to The Marconi Company Limited, a company of Great Britain
Filed Nov. 2, 1959, Ser. No. 850,190
Claims priority, application Great Britain, Nov. 3, 1958, 25,276/58
6 Claims. (Cl. 343—8)

This invention relates to radar systems and more specifically to speed measuring Doppler radar systems. Though not limited to its application thereto, the invention is particularly advantageous for and primarily intended for what are now becoming known as police radar systems, i.e. radar systems designed to measure the speeds of vehicles moving along a highway.

It is obviously desirable in a police radar system to make the transmitted beam as sharp and narrow as possible because the sharper the beam the better the concentration of radio energy upon a vehicle intercepting it and also the easier it is to observe the speed of one vehicle at a time, even if that vehicle is part of a stream of traffic. However, the narrower the beam, the shorter will be the time in which a vehicle moving at a given speed is in it. This has led to difficulties in reliably observing the speeds of fast moving vehicles in a traffic stream, in part because the period of time during which the speed indicating meter of the radar system indicates speed of any particular vehicle is so short, and in part because, if one fast moving vehicle is followed closely by another, the speed indicating meter will give two short successive speed readings, one for each vehicle. The present invention seeks to provide improved and simple speed measuring Doppler radar systems which will give good, reliable, and readable indications of speed even if the target observed encounters the transmitted waves for only a short period of time and even though it is followed fairly closely by another target.

According to this invention a speed measuring Doppler radar system comprises a radio transmitter, a radio receiver adapted to receive radio waves transmitted from said transmitter and reflected back by a target encountered by the transmitted waves, means for deriving from the transmitted and received waves a signal representative of the Doppler frequency due to the relative speed of said target towards or away from the receiver, means for storing said signal, means for measuring the stored signal to ascertain said relative speed and means actuated automatically on storage of a signal for preventing the supply of further Doppler-representative signals to the storage means.

Preferably the signal representative of Doppler frequency is derived by translating Doppler frequency into a voltage of value dependent thereon, and the storage means is a condenser in which said voltage is stored and measured to ascertain speed. In a preferred embodiment of this nature signals derived from the received waves are mixed with signals derived from the transmitter to produce the Doppler frequency and the said Doppler frequency is employed to control the frequency of a generator of pulses of substantially constant amplitude and width, the alternating component of the output from said generator being rectified to constitute the signal representative of Doppler frequency. This signal, amplified if required, is fed to a storage condenser the voltage across which is measured to ascertain speed and is also employed, upon reaching a predetermined minimum value, to render the pulse generator inoperative.

Preferably the system also comprises means, actuated automatically a predetermined time after a signal representative of Doppler frequency has been stored and measured, for destroying the stored signal and restoring the supply of Doppler-representative signals to the storage means. Where the stored signal is derived from a pulse generator as above described and is stored in a condenser the voltage across which is utilised, upon reaching a predetermined minimum value, to render said generator inoperative, means, operated automatically a predetermined time after said minimum value is reached, may be provided for short-circuiting said condenser and thereby restoring operability of the pulse generator.

The invention is illustrated in the accompanying drawing which shows partly in block diagram form and partly in simplified circuit diagram form, a police radar embodiment of the invention. Certain suitable voltage values are indicated in the drawing and in describing the said drawing certain values of frequency will be mentioned. It is to be understood, however, that these voltage and frequency values are by way of example only.

Referring to the drawing, the reference numeral 1 denotes any suitable and conventional Doppler radar equipment arranged to provide at its signal output terminal 3 a Doppler frequency signal indicative of the speed of a vehicle being observed. The Doppler radar equipment 1 will of course include a radio transmitter which is connected to the directional aerial 2, a radio receiver also connected to aerial 2 and adapted to receive those radio waves which are transmitted from the transmitter and reflected back by a target, and means, e.g. a mixer, for deriving from the transmitted and received waves a signal representative of the Doppler frequency due to the relative speed of the target towards or away from the system.

The derived Doppler frequency signal appearing at output terminal 3 is fed through series condensers 20 and 21 as the synchronising or triggering input to a pulse generator in the form of a multivibrator which is known per se and includes the two transistors 22 and 23. This multivibrator is of a type adapted to produce substantially constant amplitude-constant width pulses of the same frequency as that which is fed into it through the condensers 20 and 21, i.e. the Doppler frequency. The pulse output will accordingly consist of substantially constant amplitude-constant width pulses repeated at the Doppler frequency. These pulses are amplified by an amplifier 24 the output of which is taken through a condenser 25, adjustable resistance 26 and rectifier 27 to the control grid of a valve 28. Due to the presence of the condenser 25 the D.C. component of the pulses from the pulse generator will be removed and the A.C. component will be rectified by the rectifier 27. This rectified resultant charges a storage condenser 29 in the grid circuit of the valve 28. It will be seen that the voltage across the condenser 29 will be a direct measure of the frequency of the pulses from the pulse generator and therefore of the Doppler frequency. This voltage is, in effect, measured by a meter 30 which may be calibrated directly in miles per hour and is included in the cathode return circuit of the valve 28.

The cathode return circuit of the valve 28 also includes a cathode return resistance 31, the voltage across which is applied across a potentiometer, the adjustable tap 32 of which is connected to the base of a transistor 33 which is so biased as to be normally conductive. The collector of this transistor is connected to the base of a further transistor 34 biased to be normally non-conductive by a battery 35. In the collector circuit of the transistor 34 is the operating coil 36 of a relay whose normally open contacts 37 are across the condenser 29. The common point of connection of the base of the transistor 34 and the collector of the transistor 33 is taken through resistance 38 to the base of a further transistor 39, the collector of which is connected to the junction point of the condensers 20 and 21 and receives suitable bias (say —9 volts) from a source (not shown) which is connected to terminal 40 and also supplies bias for the collector of transistor 33. The transistor 39, like the transistor 34, is normally cut-off. The applied potentials and the circuit dimensions are such that when the voltage across the resistance 31 reaches a predetermined minimum value, i.e. when the voltage stored in the condenser 29 reaches a predetermined minimum value—in practice this minimum value might be such as to correspond to a vehicle speed of 10 miles per hour or some other chosen low speed—the normally conductive transistor 33 is cut off. This renders the normally cut-off transistor 39 conductive and changes the potential at the junction point of the series condensers 20 and 21 to such a value as to paralyse the pulse generator which accordingly ceases to operate. Accordingly as soon as a Doppler frequency corresponding to a particular desired minimum speed produces a predetermined voltage across the condenser 29 there is no further signal input to that condenser and the meter 30 continues to read the speed of the vehicle which was in the beam when the transistor 33 became non-conductive. In this way a steady meter reading, long enough to be read reliably is obtained, even when the vehicle observed is a fast moving vehicle which is in the beam for only a very short time. After the lapse of a further predetermined time which is determined by the time constant provided by the condenser 41 (between the collector and emitter of the transistor 33) and the resistance 42, the normally non-conductive transistor 34 becomes conductive, the relay coil 36 is energised and the contacts 37 close to short-circuit the condenser 29. This automatically renders the whole apparatus ready to read the speed of the next target since, on discharge of the condenser 29, the transistors 33, 34 and 39 are restored to their original conditions of conductivity and the pulse generator is again operative.

The apparatus illustrated thus operates automatically to read the speed of any target exceeding a predetermined minimum speed, maintain that reading after the target has left the beam and even though a new target has entered the beam, and then restore itself to its original condition ready to read the speed of another target.

I claim:
1. A speed measuring Doppler radar system comprising a radio transmitter, a radio receiver adapted to receive radio waves transmitted from said transmitter and reflected back by a target encountered by the transmitted waves, means for deriving from the transmitted and received waves a signal representative of the Doppler frequency due to the relative speed of said target towards or away from the receiver, means for storing said signal, means for measuring the stored signal to ascertain said relative speed and means actuated automatically on storage of a signal for preventing the supply of further Doppler-representative signals to the storage means.

2. A system as claimed in claim 1 wherein the signal representative of Doppler frequency is derived by translating Doppler frequency into a voltage of value dependent thereon, and the storage means is a condenser in which said voltage is stored and measured to ascertain speed.

3. A system as claimed in claim 1 wherein signals derived from the received waves are mixed with signals derived from the transmitter to produce the Doppler frequency and the said Doppler frequency is employed to control the frequency of a generator of pulses of substantially constant amplitude and width, the alternating component of the output from said generator being rectified to constitute the signal representative of Doppler frequency.

4. A system as claimed in claim 3 wherein the signal representative of Doppler frequency is fed to a storage condenser the voltage across which is measured to ascertain speed and is also employed, upon reaching a predetermined minimum value, to render the pulse generator inoperative.

5. A system as claimed in claim 1 and comprising also means, actuated automatically a predetermined time after a signal representative of Doppler frequency has been stored and measured, for destroying the stored signal and restoring the supply of Doppler-representative signals to the storage means.

6. A system as claimed in claim 4 wherein means, operated automatically a predetermined time after said minimum value is reached, are provided for short-circuiting said condenser and thereby restoring operability of the pulse generator.

References Cited by the Examiner
UNITED STATES PATENTS
2,785,395   3/57   Platzman _____ 343—8

CHESTER L. JUSTUS, *Primary Examiner.*
FREDERICK M. STRADER, *Examiner.*